Nov. 3, 1925.

A. E. BUNT

AUTOMOBILE DRIVER'S SEAT

Filed April 10, 1925

1,559,672

INVENTOR
A.E.BUNT.
BY
ATTORNEYS.

Patented Nov. 3, 1925.

1,559,672

UNITED STATES PATENT OFFICE.

ALFRED ERNEST BUNT, OF TORONTO, ONTARIO, CANADA.

AUTOMOBILE DRIVER'S SEAT.

Application filed April 10, 1925. Serial No. 22,175.

*To all whom it may concern:*

Be it known that I, ALFRED ERNEST BUNT, a subject of the King of Great Britain, and a resident of the city of Toronto, in the county of York, in the Province of Ontario, Canada, have invented certain new and useful Improvements in Automobile Drivers' Seats, of which the following is the specification.

My invention relates to improvements in automobile drivers' seats, and the object of the invention is to devise simple means whereby the seat can be adjusted in a forward or rearward direction to suit the driver, so that the reach between the seat and the pedals of the car may be regulated according to the height of the driver, and it consists essentially of the arrangement and construction of parts hereinafter more particularly explained.

In the drawings like characters of reference indicate corresponding parts in each figure.

Figure 1:
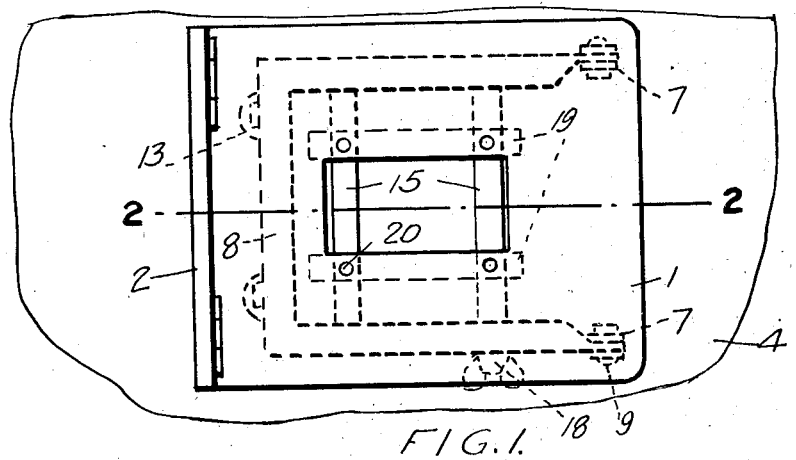
Fig. 1 is a plan view of my seat.
Figure 4:
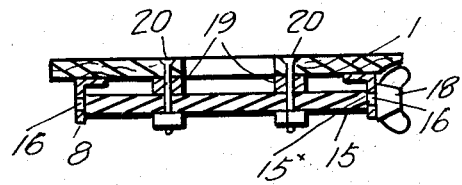
Fig. 4 is a transverse sectional view on line 4—4 Figure 2.

1 indicates the seat frame to which is hingedly connected in the usual manner the back 2.

4 is the floor board of the car. 5 are standards secured in the floor board as indicated at 6, and extending upward therefrom and provided with forked upper ends 7.

8 is a U-shaped angle bar frame which is secured to the seat frame, the forwardly extending arms of the U being pivotally mounted in the fork 7 of the standards 5 by bolts 9. The vertical depending flanges of the U frame 8 are provided with longitudinal slots 10.

Figure 2:
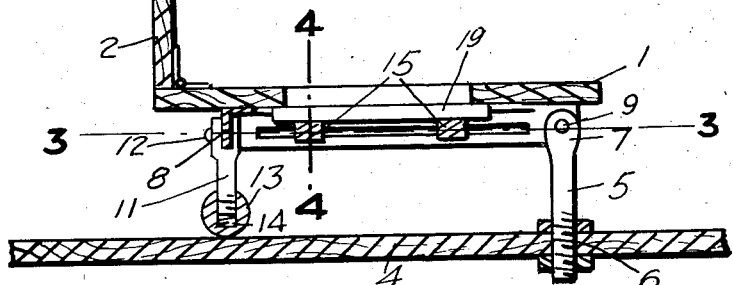
Fig. 2 is a longitudinal sectional view on line 2—2 Figure 1.
Figure 3:
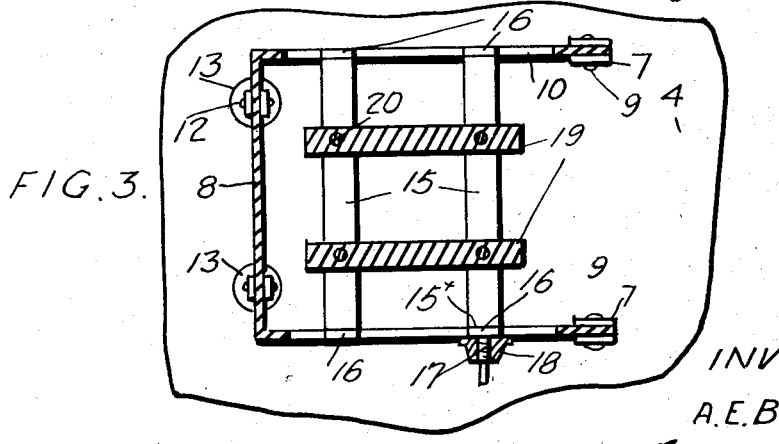
Fig. 3 is a sectional plan view on line 3—3 Figure 2.

11 are supports secured to the transverse vertical flange of the frame 8 as indicated at 12, see Figure 2, the lower ends of the supports 11 being threaded.

13 are balls provided with internally threaded orifices 14 into which the lower threaded ends of the supports 11 are screwed. By this means the rearward and downward tilt of the seat may be adjusted to suit the driver.

15 are cross bars provided with flattened reduced portions 16 slidably fitting within the slots 10. One of the portions 16 is provided with a threaded stem 17 extending outward therefrom, and upon which is screwed a wing nut 18, or any other suitable form of nut adapted to draw the cross bar 15 longitudinally of itself, so that the shoulders located at 15ˣ are forced into clamping contact with the inner face of the vertical flange of the frame 8.

19 are spacing bars, and 20 are bolts extending from the seat frame 1, spacing bars 19 and transverse bars 15.

When it is desired to adjust the seat either forward or rearward all it is necessary to do is to loosen the nut 18 and move the seat forward or rearward to the desired position, the reduced portions 16 sliding within the slots 10 during this operation.

What I claim as my invention is:

In an automobile seat, the combination with the seat frame, of a U-shaped supplemental frame having longitudinally slotted side arms, standard supports upon which the ends of the side arms are pivotally mounted, transverse bars having reduced ends slidable within the slotted arms of the supplemental frame, menas for securing the transverse bars from moving within the slotted arms, and a support for the rear portion of the supplemental frame.

ALFRED ERNEST BUNT.